United States Patent [19]

Schantz

[11] 3,789,822
[45] Feb. 5, 1974

[54] HINGED COVER DEEP FAT FRYER, GRIDDLE AND BARBEQUE

[75] Inventor: John S. Schantz, Marine, Ill.

[73] Assignees: Raymond G. Schantz; Socrates J. Schantz, both of Marine, Ill. ; part interest to each

[22] Filed: Nov. 30, 1972

[21] Appl. No.: 310,774

[52] U.S. Cl. .............................. 126/41 R, 126/25 R
[51] Int. Cl. ......................... A47j 37/00, F24c 3/04
[58] Field of Search............................. 126/41, 25, 9

[56] References Cited
UNITED STATES PATENTS

| | | | |
|---|---|---|---|
| 3,489,132 | 1/1970 | West.................................. | 126/25 R |
| 3,244,163 | 4/1966 | McGlaughlin..................... | 126/25 R |
| 3,027,887 | 4/1962 | Krohncke.......................... | 126/25 R |
| 3,289,801 | 12/1966 | Jerkins.............................. | 126/41 R |
| 2,817,331 | 12/1957 | Kaplan et al..................... | 126/41 R |
| 3,388,421 | 6/1968 | Koziol.............................. | 126/25 R |

Primary Examiner—Edward G. Favors
Attorney, Agent, or Firm—Glenn K. Robbins

[57] ABSTRACT

A portable gas stove supporting for separate use a deep fat fryer, griddle and barbeque with a uniquely designed cover which serves as a griddle when in a closed position, a deep fat fryer in a reversed or inverted position and a barbeque heat reflector and windshield when opened to a vertically extending position. The stove has an open top within which a gas burner is provided. The open top of the stove supports the cover in a closed position where the flat top surface of the cover acts as a griddle. Hinge means enable the cover to be opened to a vertical position acting as a heat reflector and windshield. When the cover is reversed its open box like structure enables it to receive grease to act as a deep fat fryer. Hinged means are provided enabling the cover to rest upon the open top housing of the stove and be quickly hinged to a vertically extending in open position for use as a barbeque and to further enable the cover to be removed and reversed to act as a deep fat fryer.

14 Claims, 17 Drawing Figures

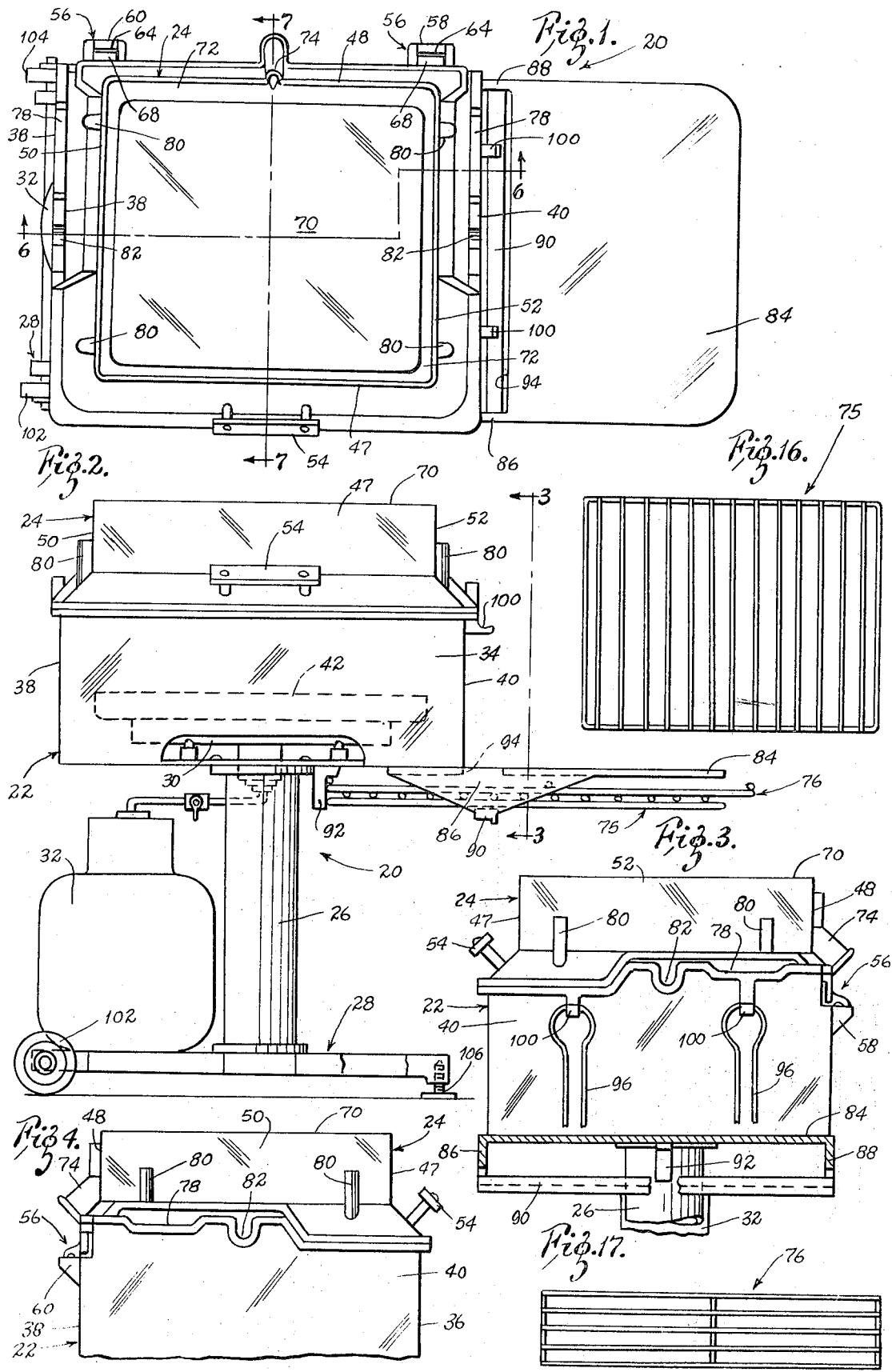

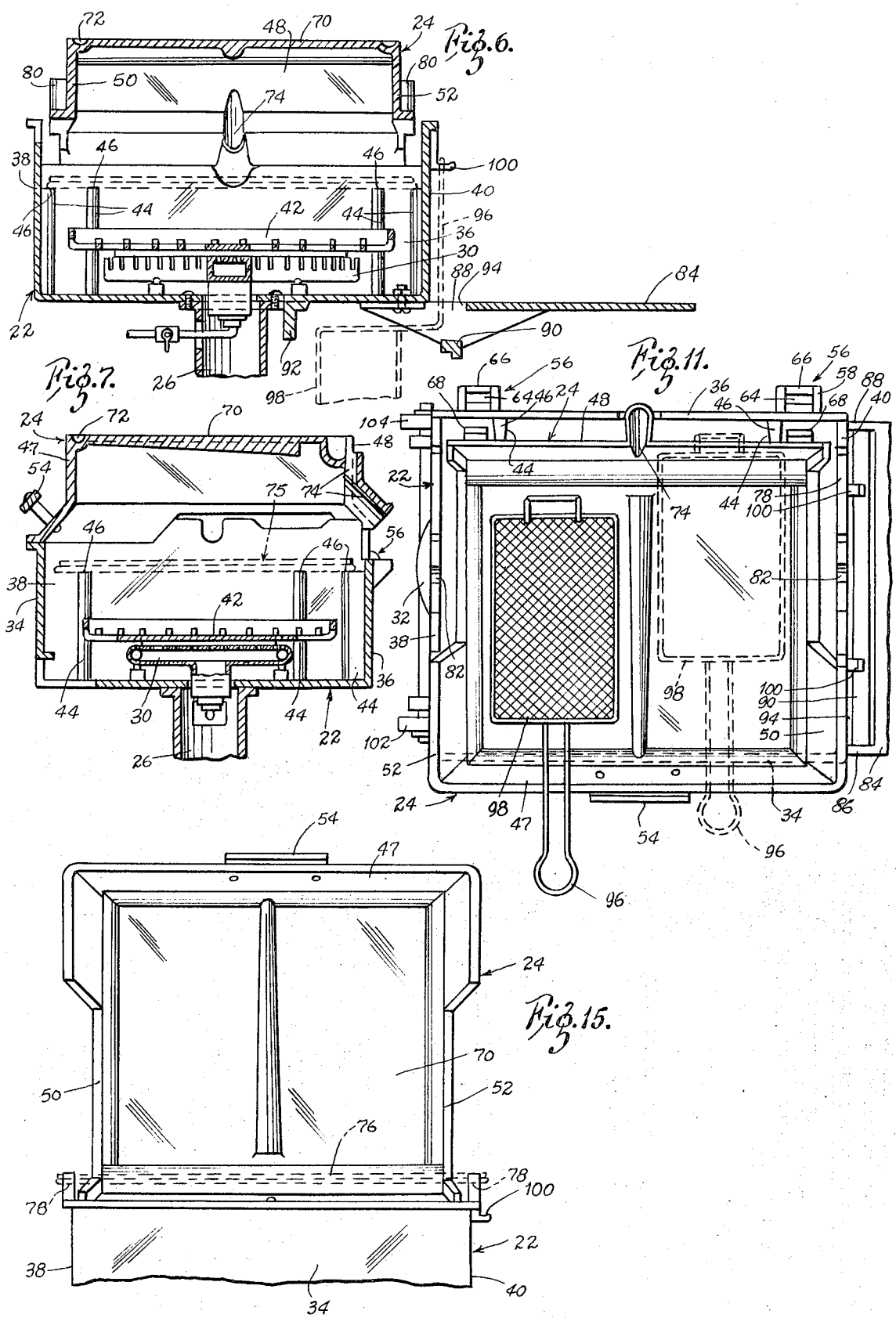

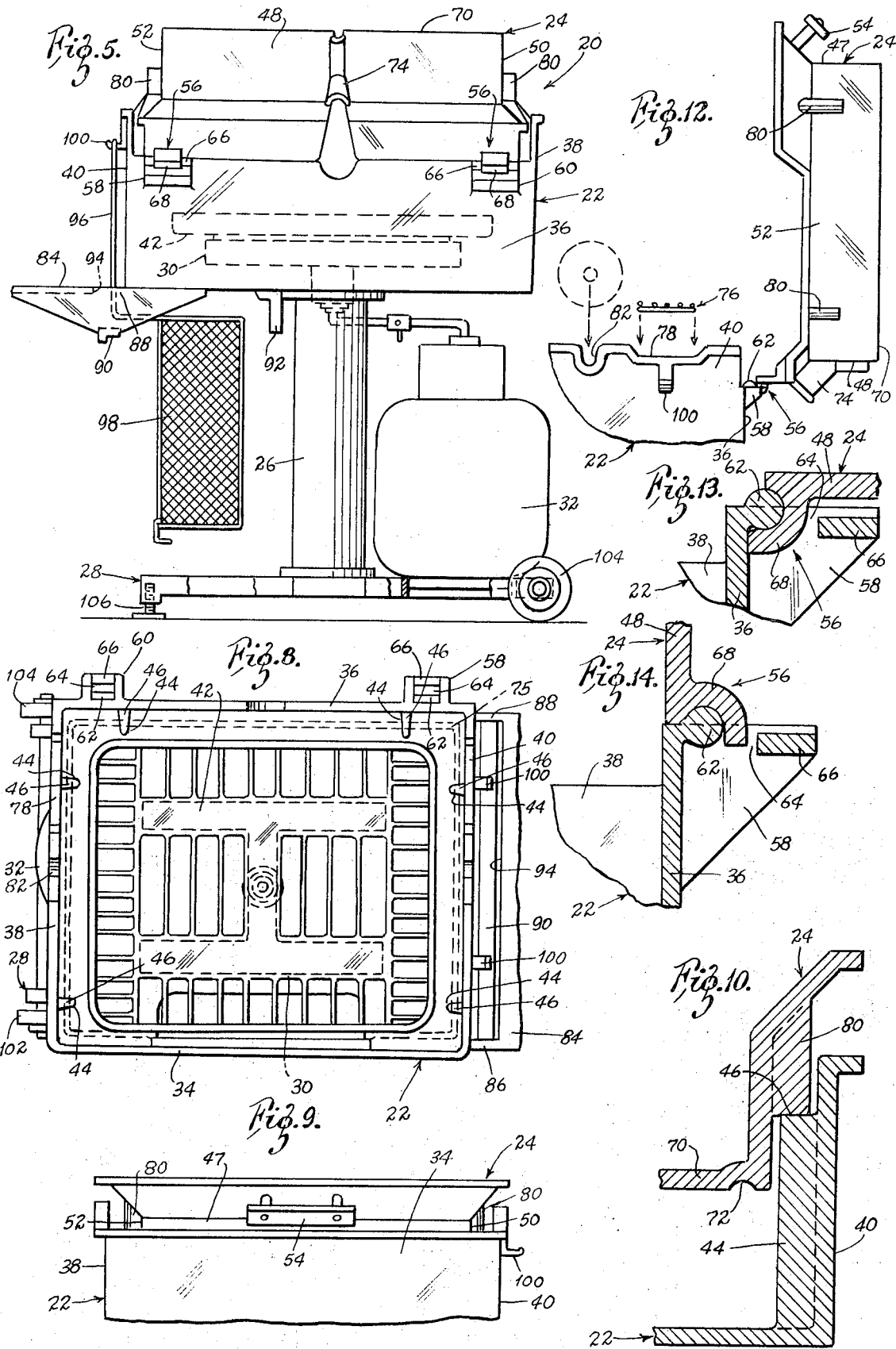

3,789,822

HINGED COVER DEEP FAT FRYER, GRIDDLE AND BARBEQUE

RELATED INVENTIONS

This application is co-pending with applicants application Ser. No. 242,653 filed Apr. 10, 1972 for Portable Three-In-One Deep Fat Fryer, Griddle and Barbeque Combination.

SUMMARY OF THE INVENTIONS

In the past various types of portable stoves have been employed as barbeque and other type of cooking arrangements. Such stoves would generally not lend themself to portable use for combined operations in deep fat frying, griddle or grill frying and barbequeing. The instant stove is portable through the provision of wheels such that it can be wheeled about and provides complete adaptebility for the combined use of the deep fat fryer, griddle and barbeque.

By means of this invention there has been provided a portable stove which can be used in family gatherings, civic gatherings and the like to prepare outdoor meals by means of deep fat frying, frying on a griddle, or barbequeing for relatively large numbers of people without the use of extensive commercial equipment. The portable stove is wheeled and is provided with a central gas burner in an open portion of the stove which has an open top to receive the fryer, the griddle or barbeque grill or grate means. The gas burner can conveniently connected to conventional cylinders of bottle gas or natural gas.

The open portion of the stove receives a specially designed cover which is of a somewhat box-like construction. The top of the cover is flat with the cover being open at the bottom. The flat surface when the cover is in a closed position on top of the housing serves as a griddle or grill. Mounted at the rear hinge means enable the cover to be raised to a vertical position in which position the cover is supported by a plate-like hinge member which extends from the rear of the housing and acts as support and stop for the cover with the box-like opening acts to reflect heat and the cover also serves as a windshield when barbequeing is performed in the stove on specially provided grill or grate means.

When deep fat frying is desired to be employed the cover is turned up-side down with the open portion facing up and the cover is supported upon specially designed posts formed at the sides of the housing with the top of the posts acting as a ledge to support the deep fat fryer above the burner.

The stove is further provided with a shelf at the side serving to support utensils, grills or grates and the like. Underneath the shelf rack support means are provided for receiving barbeque racks or grates when not in use. The shelf is spaced from the side of the housing such that a deep fat basket can be supported by attaching the handle through the spacing to a hook support to provide a compact means for storage of baskets with their being stored out of way and yet ready for use when desired with easy access thereto. The portable stove of this invention with the fryer, griddle and barbeque combination is very simply adapted for interchangeable use. It is rugged in construction and simple in operation with the cover through the hinging means being ready for use in each of the griddle, barbequeing and deep fat frying operations.

The above features are objects of this invention and further objects will appear in the detailed description which follows and will be otherwise apparent to those skilled in the art.

For the purpose of illustration of this invention there is shown in the accompanying drawings a preferred embodiment thereof. It is to be understood that these drawings are for the purpose of example only and that the invention is not limited thereto. In the drawings:

FIG. 1 is a top plan view of the grill with the cover;

FIG. 2 is a view in front elevation of the grill showing grills supported bolow a side table;

FIG. 3 is a view in elevation taken from the right side of the grill showing the upper portion taken on line 3—3 on FIG. 2 with the griddle removed and the handle ends of wire basket shown on hooks;

FIG. 4 is in fragmentary view in elevation of the upper portion of the grill taken from the left side;

FIG. 5 is a view in rear elevation with the griddles removed and the basket shown hung on the hooks;

FIG. 6 is a view vertical section taken aproximately on line 6—6 of FIG. 1;

FIG. 7 is a view in vertical section taken on the line 7—7 of FIG. 1;

FIG. 8 is a top plan view showing the cover removed with the large grill or rack shown in broken lines;

FIG. 9 is a fragmentary view in front elevation of the upper portion of the cover in inverted position;

FIG. 10 is an enlarged fragmentary view in vertical section showing the support for the inverted cover;

FIG. 11 is a top plan view with the inverted cover in place for use in the deep fat frying;

FIG. 12 is a fragmentary view in side elevation taken from the right side showing the cover raised;

FIG. 13 is a fragmentary view in enlarged verical section through the hinge in the cover raised position;

FIG. 14 is an enlarged fragmentary view in section showing the cover down in closed position;

FIG. 15 is a fragmentary view in front elevation showing the cover raised similarly to FIG. 12;

FIG. 16 is a plan view of a large grill or rack used with the device;

FIG. 17 is a plan view of a narrow grill or rack used with the device.

DESCRIPTION OF THE INVENTION

The portable stove of this invention is generally identified by the reference numeral 20 as best shown in FIG. 1, 2 and 5. It is comprised of the housing 22 having a hinged cover 24 and is supported by a post 26 upon a wheeled stand 28. The burner 30 receives fuel from a gas tank 32 supported from the stand.

The housing 22 is of generally rectangular configuration having an open top defined by front and rear walls 34 and 36 and side walls 38 and 40 as best shown in the top plan view in FIG. 8. The burner 30 is supported at the bottom of the housing and is provided with a protective shield 42 shown in dark lines in FIG. 8 to prevent grease drippings from falling upon the burner. The interior surfaces of the side walls 38 and 40 and the rear wall 36 are provided with vertically extending posts 44 as shown in FIG. 8 and 10 which extend from the bottom of the housing to just below the top edges of the side and rear walls. These posts have a ledge surface 46 at the top which serves to support the cover when it is inverted in use to serve as a deep fat fryer as will be further explained hereinbelow.

The cover 24 is best shown in the top plan view of FIG. 1, the front elevation of FIG. 2, the rear elevation view of FIG. 5 and the sectional view of FIGS. 6 and 7. It is formed of a generally inverted box-like structure having vertically extending front and rear walls 46 and 48 and side walls 50 and 52. The front and side walls flare as best shown in FIG. 2 in order that the periphery of the walls of the bottom rest upon the flat surfaces formed at the top walls of the housing. A handle 54 is formed at the front of the cover.

Hinge means generally identified by the reference numeral 56 in FIGS. 12 to 14 are provided connecting the bottom rear wall of the cover to the top rear wall of the housing. This hinge means is comprised of a bracket support 58 and 60 formed at the top edge of the rear wall of the housing. The racket has an offset cylindrical bearing surface 62 forming the front edge of a slot 64 formed within a horizontal rest support 66 which serves as a stop for the hinging movement of the cover. The bottom portion of the rear wall of the cover has an arcuate spur-like member 68 which conforms with the cylindrical bearing surface 62 such that the member fits through the slot 64 and bears upon the bottom hinge bearing member 62. The cover is shown in the closed position in FIG. 14 and in the fully open position in FIG. 13 where the rear wall 48 of the cover rests against the support 66. In the closed position the rear wall 48 rests upon the rear wall 36 of the housing as well as the bearing surface 62.

In the closed position the cover as best shown in FIGS. 1, 2 and 5 serves as a griddle. The griddle is formed by the flat top surface 70 of the cover which is bounded by a rearwardly sloping gutter 72 formed at the periphery having a deep rear gutter or trough by means of which grease can be drained through a spout 74 at the rear of the cover.

The cover in the open position as shown in FIG. 12 serves not only as an out of the way storrage place but also as a heat reflector and windshield when the stove is used as a barbeque. In the barbeque operation the open stove housing receives a conventional grill or grate 75 as shown in FIG. 16. This grill as shown in the dotted lines in FIG. 8 rests upon the ledge surface 46 of the supports 44 formed in the housing. In the barbequeing operation a warmer grill 76 may also be employed for warming buns or keeping other food warm. The warmer grill 76 is supported by a depressed portion 78 formed in both side walls at the rear portion thereof as best shown in FIG. 3 and 12.

For the deep fat frying operation the cover 24 is adapted to be inverted from the closed position shown in FIG. 2 and placed in the inverted position inside the housing. In the inverted position stud portions 80 formed at the sides of the rectangular portion of the cover as best shown in FIGS. 1 and 10 rest upon the ledge surfaces 46 of the vertical posts 44. The cover in the inverted position of th deep fat frying operation is then supported with the griddle surface 70 serving as the bottom of the deep fat fryer.

The stove is further provided with adaptability of receiving a rotisserie. This is effected through a depression or u-shaped slot 82 formed in the top middle portion of the side walls of the housing as shown in FIG. 3. This slot receives a rotisserie for use in the barbequeing operation.

The stove is designed for convenience in use through a side shelf 84 as best shown in FIG. 1, 2 and 6. The shelf extends laterally from the right side of the bottom portion of the housing and is connected to the housing by laterally extending members at front and rear designated 86 and 88 which are bolted or otherwise affixed to the bottom of the housing. A rest member 90 extends from the front to the rear of the bottom part of the supports 86 and 88. An inverted L-shaped support 92 is formed underneath the housing and serves as a stop in order that the grills or racks may be stored upon the rest member 90 with the forward ends of the screen abutting against the stop 92 as shown in FIG. 2. The shelf 84 is spaced from the right wall of the housing to form a slot 94. This slot as best shown in FIG. 6 receives handles of a deep fat fryer basket 98 in dotted lines which are suspended upon hooks 100 formed on the side wall of the housing to facilitate storrage of the baskets and hide them from view. The wire handles can be interfitted through the grill openings to provide dual storrage of both the deep fat fry basket as well as the grills. The portable stove is supported for easy wheeled movement upon the stand 28 as shown in FIG. 2. A pair of wheels 102 and 104 are connected at the front of the stand while a leveling screw 106 is provided at the rear. By this means the stand can be moved from one place to another and levelled upon uneven ground through the levelling adjustment. In the moving operation the shelf 84 can be grasped and used as a handle to provide a dual functional of storing and use as a handle.

USE

The portable stove of this invention is simply adapted for use in any desirable location by simply wheeling it to the position desired by lifting upon the shelf surface 84 and wheeling it upon the wheels. When at the disired position it is connected either to a gas line or the gas supply of the fuel tank 32 is employed to provide gas to the burner 30. The stove can be used at family gatherings, barbeques, fund raising outdoor dinners and the like where a substantial number of people are to be served. The stove lends itself to fish frys by the deep fat fryer, pancake dinners or the like by the use of the griddle and barbequeing through the use of the barbeque grill and rotisserizing.

Ready interchangeability of the various pieces of cooking apparatus for different types of cooking operations is readily accomplished through the construction of the open top stove and the hinging means for the specially designed cover enabling it to be hinged from use as a griddle in the cover closed position to use as a barbeque in the cover open or raised position where the cover serves as a heat reflector and windshield and finally in the third use for use as a deep fat fryer where the cover is simply lifted out of the hinge support and inverted to be supported within the housing.

The use of the stove as a griddle is simply portrayed in FIGS. 1 and 7. In this position the cover is closed and the flat top surface 70 is used as a griddle. Excess grease when formed flows through the gutter 72 into the deep trough across the back of the griddle and then can be poured out through the drain spout 74 when frying is done.

For barbequeing use the cover is simply raised from the hinge closed position shown in FIG. 14 to the open position shown in FIGS. 12 and 13. In this position the cover is opened and raised and serves as a heat reflector and windshield. The barbeque grill 75 is simply placed over the burners to rest upon the ledges 46 of the vertical support members 44. The bun warmer grill 76 may be placed upon the depressed ledges 78 where this grill is spaced from the burner a further distance to receive less heat for warming rather than cooking. The barbequeing position is shown in FIG. 8 where the grill 75 is indicated in dotted lines to rest above the burners. In the barbequeing position a rotisserie may also be employed by simply resting the rotisserie ends in the slots 82 formed in the side walls of the housing.

For the deep fat fry operation the cover is simply lifted away from the hinged support member by withdrawing the arcuate member 68 away from the slot which is accomplished by simply lifting the cover. The cover is then inverted to place the top surface 70 which normally serves as a griddle surface to the bottom and the studs 80 are rested upon the support ledges 46 of the vertical posts 44 in the relationship shown in FIG. 10. The griddle surface 70 then acts to receive the burner flame and transmit heat in the deep fat frying operation. The deep fat frying position is best shown in FIG. 11 where a conventional fry basket is shown supported within the inverted cover and as shown in dotted lines may be rested upon the top rim of the cover when the cover is inverted for grease drainage. In the inverted position the grease drain opening 74 serves to receive a thermometer (not shown) which can be supported against it to sense the temperature of the grease in the fryer. The gutter like opening 74 also acts as a spout to drain grease by tilting the inverted cover to the rear from the position shown in FIG. 11.

When the various cooking operation have been completed the accessory shelf 84 serves by its substructure to support the grills or racks in the relationship shown in FIG. 2. The deep fat fry baskets may be supported upon the hooks 100 formed at the side wall of the housing with the handles being placed between the spacings in the grills.

Various changes and modifications may be made within this invention as will be readily apparent to those skilled in the art. Such modifications and changes are within the scope and teaching of this invention as defined by the claims appended hereto.

What is claimed is:

1. A portable gas grill comprising a housing receiving a burner positioned below an open top of the housing, said open top being defined by top rims on vertically extending front rear and side walls of the housing, at least three of said rims being provided with inwardly extending support means positioned below top surfaces of the rims, an invertable cover serving as a deep fat fryer and griddle supportable on the top of the housing and means further supporting said cover in verticle position on the top of the rear rim, said cover being dish-shaped on one side and having a flat griddle surface on the opposite side, said cover being supportable in the inverted deep fat fryer position upon said inwardly extending support means and in the griddle position on the top of the rims.

2. The gas grill of claim 1 in which a hinge means is provided for the cover comprised of a rigid plate-like hinge support member extending rearwardly from the top of the rear rim of the housing, said member being provided with an elongated laterally extending slot, a forward edge of the slot having an arcuate bearing surface receiving an arcuate spur-like member extending rearwardly from a rear wall of the cover.

3. The gas grill of claim 1 in which said housing is provided with post means supporting the cover in inverted position within the open top of the housing.

4. The gas grill of claim 3 in which said post means serve as a support for cooperating stud means formed in the outside walls of the cover.

5. The gas grill of claim 2 in which said housing is provided with post means supporting the cover in inverted position within the open top of the housing and said post means serving as a support for cooperating stud means formed in the outside walls of the cover.

6. The gas grill of claim 1 in which said walls of the housing have indentations at rear portions of the top rims receiving a food warming grill.

7. The gas grill of claim 3 in which said post means receiving a barbeque grill when the cover is removed, said grill being supported beneath the top rims of the walls of the housing.

8. The gas grill of claim 7 in which said side walls of the housing have indentations at rear portions of the top rims receiving a food warming grill.

9. The gas grill of claim 1 in which said housing is provided with a laterally extending accessory shelf, said shelf being attached to the bottom of the housing and extending to one side thereof and said shelf has grill support means comprising a shallow U-shaped member supporting a barbeque grill or rack underneath the shelf.

10. The gas grill of claim 9 in which a stop means is connected to the bottom of the housing serving as a stop for the barbeque grill when butted thereagainst.

11. The gas grill of claim 1 in which said housing is provided with a laterally extending accessory shelf, said shelf being attached to the bottom of the housing and extending to one side thereof and said shelf has a slot separating the shelf surface from the housing, said slot receiving fry basket handles adapted to be hung on support hooks provided on the side wall of the housing above said slot.

12. The gas grill of claim 9 in which said shelf has a slot separating the shelf surface from the housing, said slot receiving fry basket handles adapted to be hung on support hooks provided on the side wall of the housing above said slot.

13. The gas grill of claim 1 in which said housing is provided with a laterally extending accessory shelf, said shelf being attached to the bottom of the housing and extending to one side thereof and said housing is supported on a post extending from a two wheeled stand, said rigid shelf serving as a handle for wheeling the housing and stand to desired locations.

14. The gas grill of claim 13 in which said stand is provided with levelling means.

* * * * *